United States Patent

Mueller et al.

[11] Patent Number: 5,458,742
[45] Date of Patent: Oct. 17, 1995

[54] ISOLATION OF FULLERENES

[75] Inventors: Wolfgang Mueller, Wiesbaden; Uwe Wirth, Mainhausen; Joachim Semel, Eppstein/Ts., all of Germany

[73] Assignee: Hoechst Aktiengesellschaft, Frankfurt, Germany

[21] Appl. No.: 57,124

[22] Filed: May 4, 1993

[30] Foreign Application Priority Data

May 6, 1992 [DE] Germany ............... 42 14 980.0

[51] Int. Cl.$^6$ ...................................... B01D 3/00
[52] U.S. Cl. .................. 203/91; 159/DIG. 26; 203/49; 203/100; 204/157.43; 204/157.47; 423/445 B
[58] Field of Search ............... 203/91, 100, 49; 202/205; 159/DIG. 16, DIG. 26; 423/445 B, 460, 461; 204/157.43, 157.47

[56] References Cited

U.S. PATENT DOCUMENTS

| | | | |
|---|---|---|---|
| 2,513,991 | 7/1950 | Bradbury, III | 159/DIG. 26 |
| 4,313,786 | 2/1982 | Smith | 159/DIG. 26 |
| 5,023,056 | 6/1991 | Aklufi et al. | |
| 5,024,740 | 6/1991 | Birken et al. | 204/157.43 |
| 5,132,105 | 7/1992 | Remo | 423/446 |
| 5,196,396 | 3/1993 | Lieber | 423/414 |
| 5,227,038 | 7/1993 | Smalley et al. | 423/445 B |
| 5,236,562 | 8/1993 | Okumura et al. | 204/157.43 |
| 5,271,890 | 12/1993 | Shimura et al. | 204/157.47 |
| 5,273,729 | 12/1993 | Howard et al. | 423/445 B |
| 5,277,773 | 1/1994 | Murphy | 204/157.47 |
| 5,281,406 | 1/1994 | Stalling et al. | 423/445 B |
| 5,304,366 | 4/1994 | Lorents et al. | 423/445 B |

FOREIGN PATENT DOCUMENTS 9204279  3/1992  WIPO.

OTHER PUBLICATIONS

Kratschmer and Sorg (Sorg et al) "Spectroscopy of Matrix–isolated carbon cluster" pp. 814–821, Surface Science 156(1985).
Strem Chemicals, Inc. Publication "Procedure for Extracting Fullerenes From Raw Soot".
CA 118(24): 237024d, 1993.
Cox, D. M., Sherwood, R. D., et al., In ACS Symposium Series 418: Fullerenes, eds. G. S. Hammond and V. J. Kuck, (American Chemical Society, Washington, D.C.) pp. 117–125 (1992).
Kraetschmer, W., Lamb, L. D., et al., Nature 347, 354–358 (1990).
IBM Technical Disclosure Bulletin, 34, 222 (1991).

*Primary Examiner*—Virginia Manoharan
*Attorney, Agent, or Firm*—Curtis, Morris & Safford

[57] ABSTRACT

In isolating fullerenes from fullerene-containing soot the soot is heated by using microwaves to from 300° to 800° C. and the evaporating fullerenes are condensed.

4 Claims, No Drawings

ISOLATION OF FULLERENES

The invention relates to the isolation of fullerenes ($C_{60}$/$C_{70}$) from fullerene-containing soot.

The process of isolating fullerenes from soot generated by evaporation of hyperpure-graphite electrodes is disclosed by "Nature, Vol. 347, 1990, p. 354 et seq.". According to this reference, the soot is heated in vacuo or in an inert atmosphere to 400° C., and the volatile fullerene is condensed. This sublimation method has the drawback that, because of the poor thermal conductivity of the soot, the evaporation of the fullerenes by conventional methods is very time-consuming. In addition there is the risk that the fullerenes decompose if the fullerene-containing soot is kept at high temperatures for prolonged periods. The object of the invention is to overcome these drawbacks.

This object is achieved by heating the soot by means of microwaves to from 300° to 800° C. and condensing the evaporating fullerenes.

The soot can be heated with and without inert gas under atmospheric pressure or at a reduced pressure <1000 mbar. Heating of the soot can be effected by microwaves having a frequency of from 433 to 24125 MHz.

The main advantage of the invention should be seen in the fact that fullerene-containing soot couples very effectively with the microwave field and that the evaporation temperature is reached within a few seconds. Furthermore, pure fullerenes or mixtures of fullerenes are not heated by microwaves.

The invention is explained below in more detail with reference to an example:

In a commercial laboratory microwave apparatus, type MLS 1200 from Büchi GmbH, D-7320 Göppingen, fullerene-containing soot is heated in a quartz glass tube (length: 230 mm; internal diameter: 50 mm) by means of microwaves (800 watt) to 520° C. After 15 seconds, brown vapors evaporate from the soot and condense on the wall of the quartz glass tube.

HPLC analysis shows approximately 75% of $C_{60}$ and approximately 25% of $C_{70}$ in the condensate.

The experiments have shown that the ratio of $C_{60}$ to $C_{70}$ in the condensate can be affected by changing the microwave output. In the vacuum sublimation process it may be advantageous to cool the condensing surfaces (vessel walls). Possible protective gases include nitrogen, helium, argon and the like.

We claim:

1. The isolation of fullerenes from fullerene-containing soot, which consists essentially of heating the soot by means of microwaves to from 300° to 800° C. forming evaporated fullerene vapors and then condensing the vapors.

2. The isolation of fullerenes as claimed in claim 1 wherein the soot is heated in an inert gas under atmospheric pressure.

3. The isolation of fullerenes as claimed in claim 1 wherein the soot is heated at a pressure of less than or equal to 100 mbar.

4. The isolation of fullerenes as claimed in claim 1 wherein the soot is heated by means of microwaves having a frequency of from 433 to 24125 MHz.

* * * * *